Feb. 8, 1944.    C. CHEDISTER    2,341,312
TESTING DEVICE
Filed March 7, 1941    4 Sheets-Sheet 1
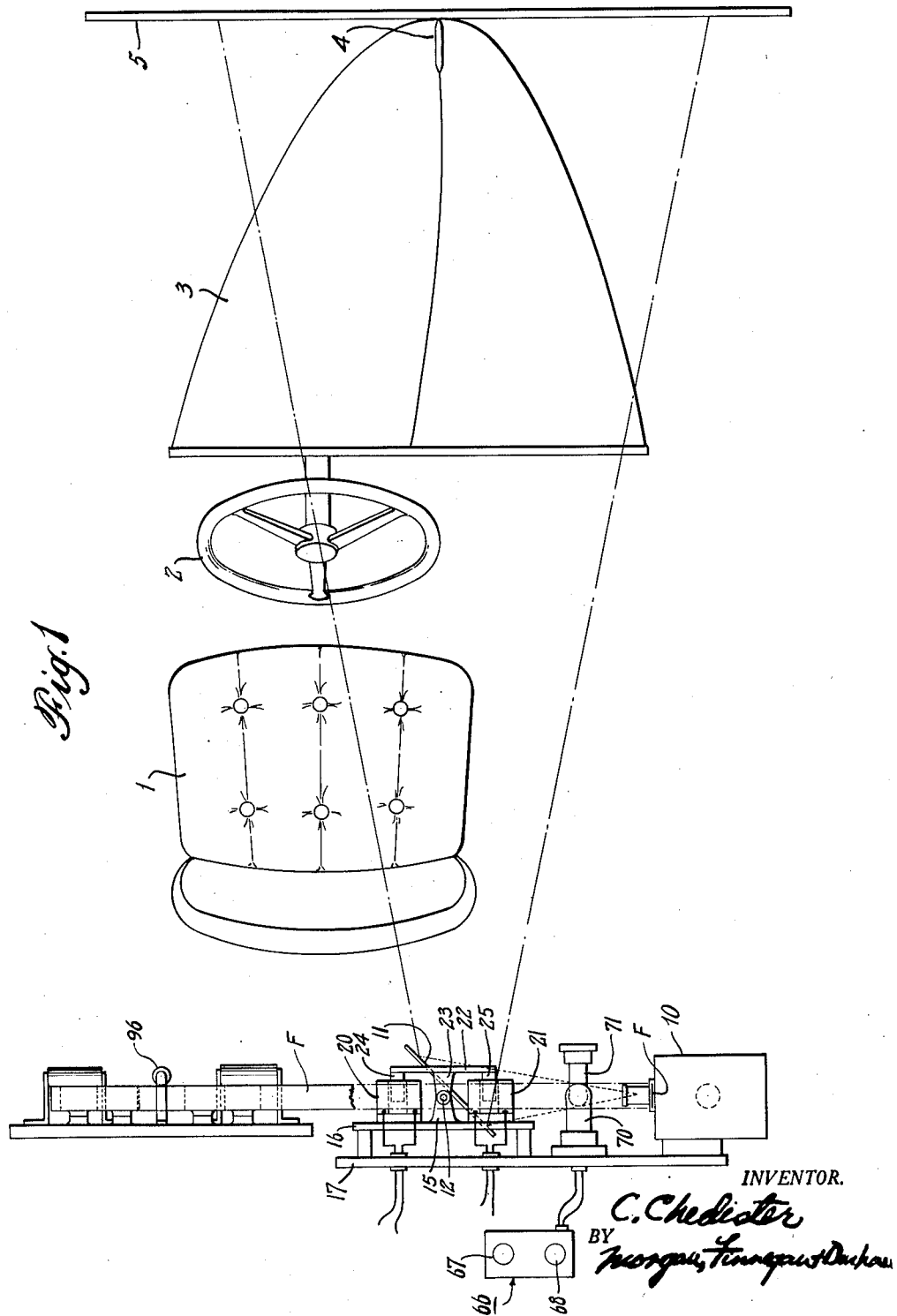
INVENTOR.
C. Chedister
BY

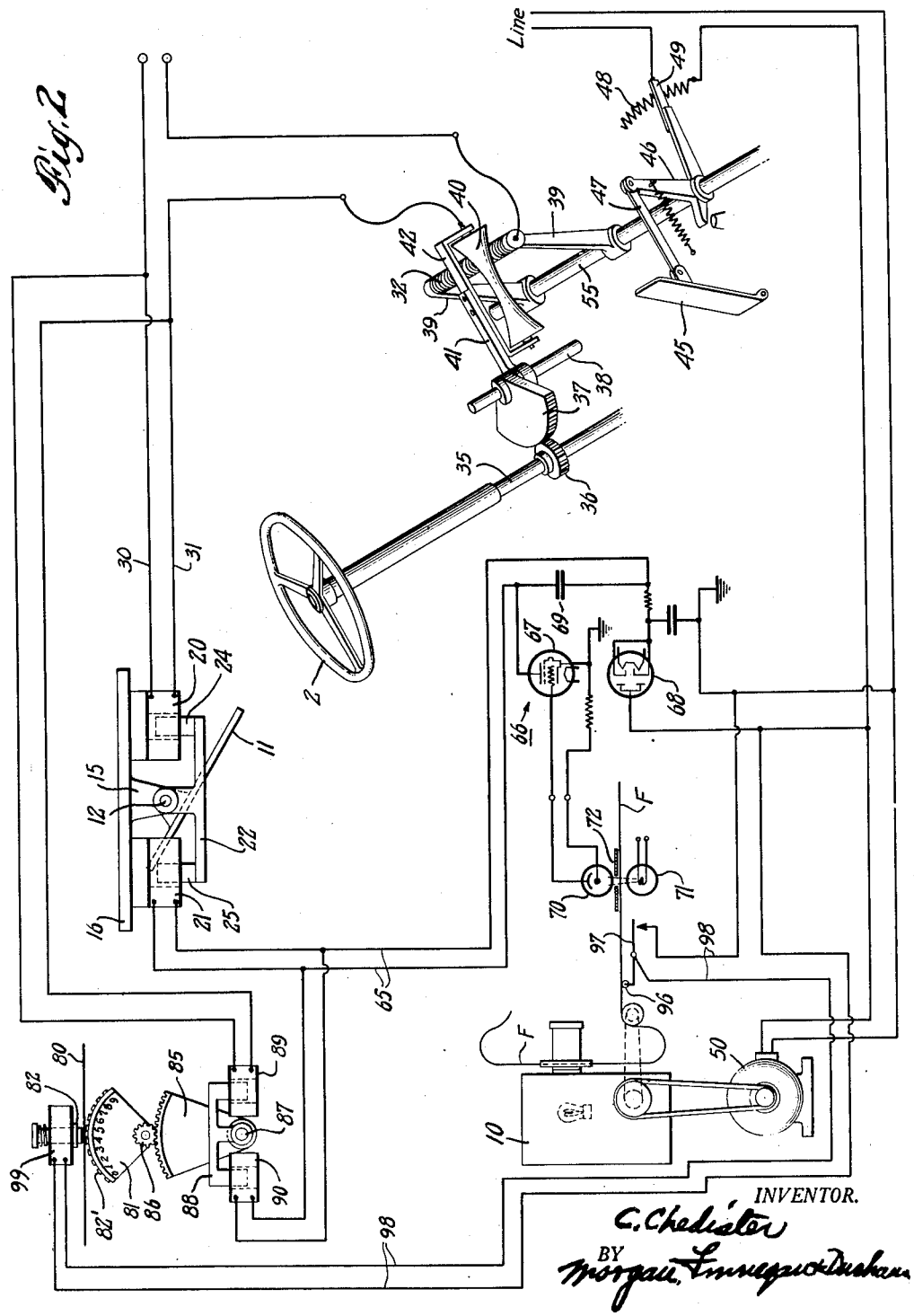

Feb. 8, 1944.                C. CHEDISTER                2,341,312
                              TESTING DEVICE
                          Filed March 7, 1941         4 Sheets-Sheet 3
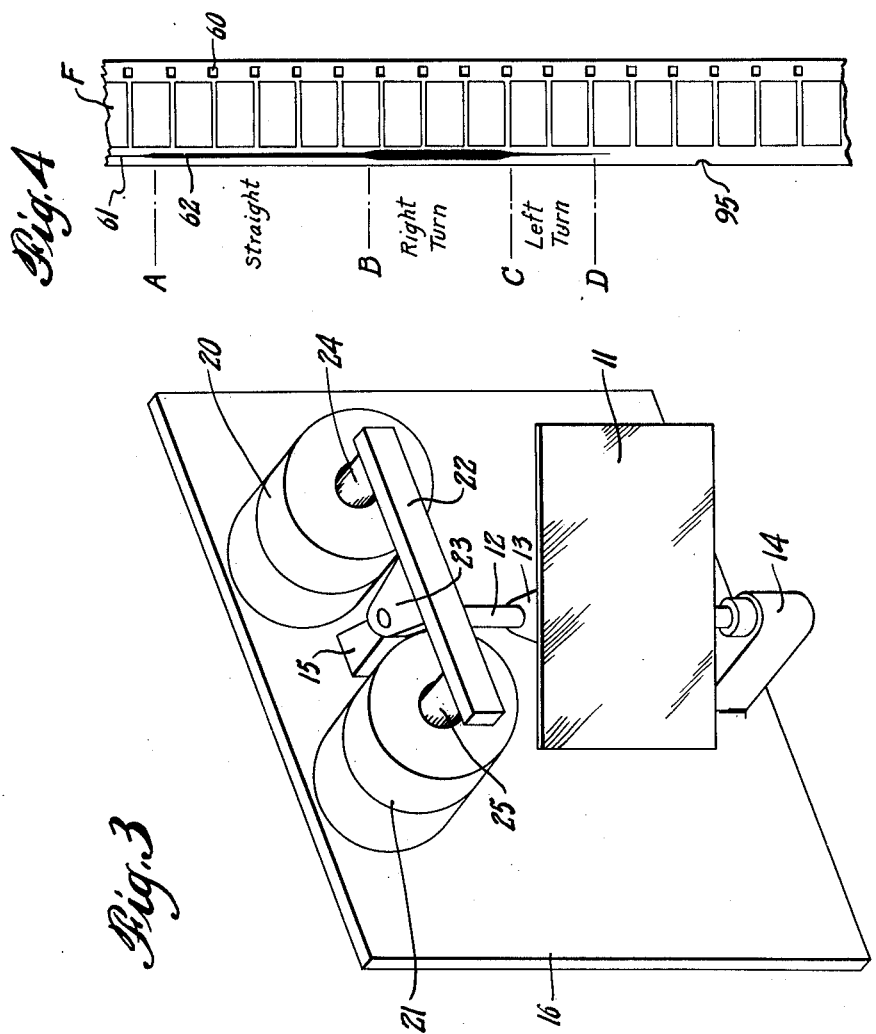
INVENTOR.
C. Chedister
BY
Morgan, Finnegan & Durham Feb. 8, 1944.   C. CHEDISTER   2,341,312
TESTING DEVICE
Filed March 7, 1941   4 Sheets-Sheet 4

INVENTOR.
C. Chedister
BY Morgan Finnegan & Durham
ATTORNEY.

Patented Feb. 8, 1944

2,341,312

UNITED STATES PATENT OFFICE 2,341,312

TESTING DEVICE

Conkling Chedister, Livingston, N. J.

Application March 7, 1941, Serial No. 382,163

19 Claims. (Cl. 35—11)

The invention relates to automatic mechanism for instructing and testing drivers and pilots of automatic equipment such as automobiles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Fig. 1 is a partially diagrammatic, fragmentary top plan view of an automobile driver-testing mechanism embodying the invention;

Fig. 2 is a diagrammatic view of the controls, recording means and associated circuits employed in said mechanism;

Fig. 3 is an enlarged detail, in perspective, of the projection mirror and controls;

Fig. 4 is a fragmentary plan view of a film having a steering control track printed thereon.

Figure 5:
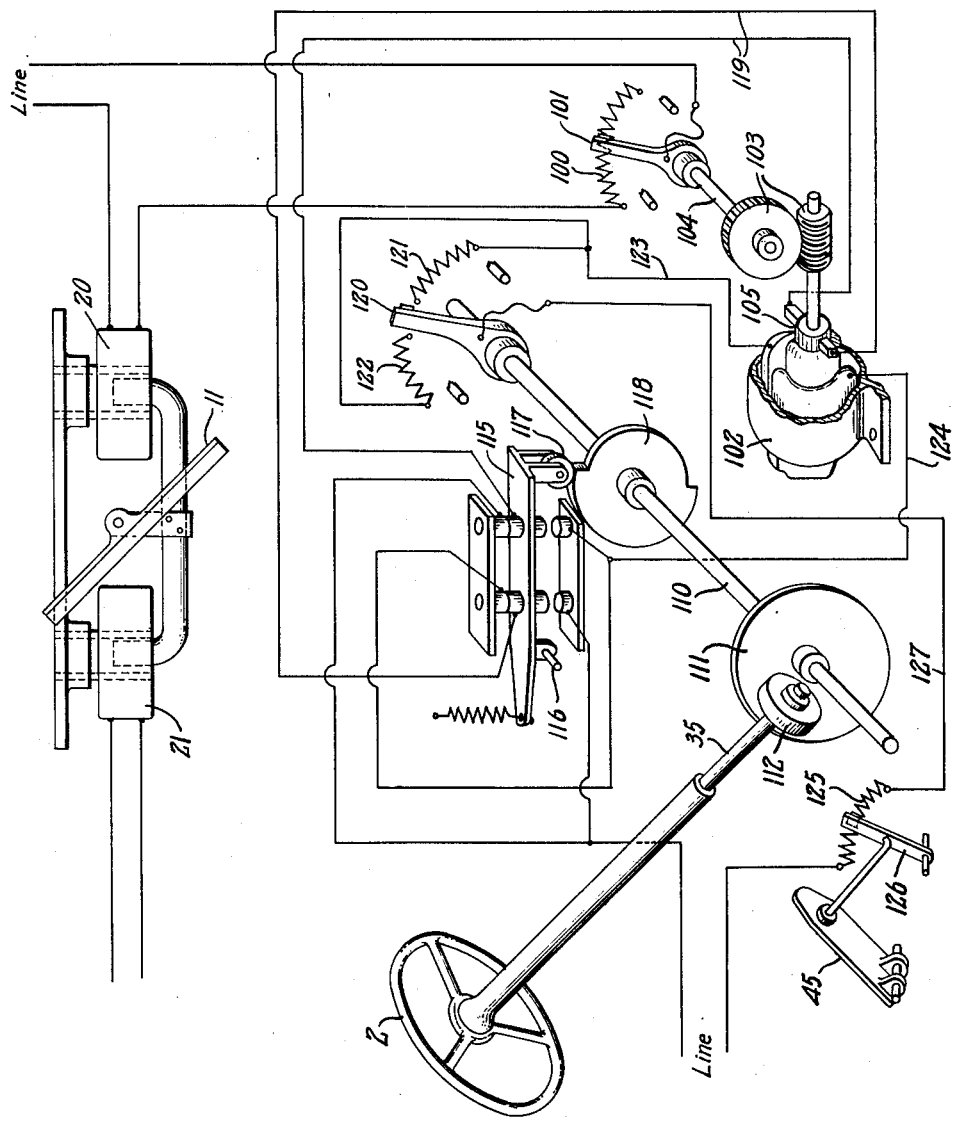
Fig. 5 is a fragmentary diagrammatic view of a modified form of steering and speed control means for positioning the projected picture.

This invention relates to automatic equipment for teaching and testing drivers or pilots of automotive vehicles and is primarily intended for use in such equipment wherein the subject is placed at the controls of an automotive vehicle and subjected to realistic stimuli which present to him the illusion of travel over a vehicle course wherein are encountered incidents representative of those naturally occurring when driving such a vehicle. While primarily directed to use in mechanisms simulating automobile travel, the invention is also applicable to other types of automotive locomotion, such as aircraft, bicycles, etc.

One object of the present invention is to provide improved means for imparting the illusion of lateral travel and turning movements, such as occur in steering an automobile laterally with respect to a road on which the vehicle is travelling.

Another object of the invention is to provide means for detecting or analyzing errors or deviations in steering a vehicle over a predetermined course.

In certain respects the invention comprises improvements over the testing mechanism disclosed and claimed in Durham and Finnegan application Ser. No. 154,234, filed July 17, 1937; Patent Number 2,269,444, January 13, 1942; in other respects it comprises an independent invention. In said application of Durham et al., the driver testing means comprise the projection of motion picture of a road or a route to be travelled, the projection of the road scene creating the illusion of forward travel. A member indicating the position of the vehicle relative to the road is subject to the operation of a steering control, while deviating movements are also automatically imparted to said member by means independent of the steering control. The subject uses the steering control to correct for said deviations, while the coordinated moving road scene carries out the illusion of steering over the road and turning corners. At the same time the subject's steering movements or errors are recorded in printed form.

I have discovered that a more realistic illusion and feeling of lateral travel and turning with respect to a projected road scene may be provided by shifting the projected scene itself laterally with respect to a stationary vehicle member, such as the silhouette of a car hood. With such a relationship between the moving scene and the car hood, the subject or driver experiences the same illusion of lateral travel over the road as in actually driving a car. In actual driving the car moves across the stationary road whereas in the present invention the road moves beneath the stationary car, so that the feeling and visual impression are the same, especially when the illusion of forward travel simultaneously is created by projection of a road picture taken while moving along the road.

The invention further comprises means for imparting lateral deviating movements to the road scene by a control which preferably corresponds to the course or curvilinear pattern of the road itself. Lateral movement may also be imparted to the projected scene by the steering wheel or other subject-operated control so that by proper steering manipulation the subject will overcome or compensate for the imparted movements and thereby hold the road scene stationary with respect to the car silhouette. When correctly handled, the visual impression is that of steering properly around curves or objects in the road. If the subject over-steers or under-steers the road scene will be shifted laterally in amounts equal to the algebraic differences between the steering movement and the imparted movement and thereby place the car silhouette at points in the road scene off the line of proper steering as determined by the course pattern. Recording means are provided for making a record of said differences in steering at all or any desired times, said record preferably being in permanent printed form.

Another object of the invention is to provide means directly associated with the projected film of the road scene for providing the curvilinear control pattern of the course and for imparting from said pattern the deviating movements required for providing the steering illusion and recording operations described above. In earlier attempts to provide such deviating movements for a road scene, it has been customary to have a cam of fixed pattern associated with the road film and working synchronously with the projection of said film. That arrangement was costly in requiring the careful machining of pattern cams and furthermore was impractical because any break in the film or change in its length by even so much as a single frame would throw the film projection out of synchronism with the pattern or cam thereby introducing an error which became cumulative during repeated projections of said film. In the present invention I provide a controlling pattern directly on the projection film itself so that said pattern is necessarily always synchronized with the film. Said pattern is preferably a recorded track of varying light transmissibility along one edge of the film, analogous to the "sound" track for sound motion pictures and said pattern track is adapted to actuate the appropriate controls through photoelectric means. Consequently, the expensive machine work heretofore required for providing steering track pattern cams is eliminated and much greater flexibility and economy in the mechanism is provided.

Another object of the invention is to provide novel and improved means for projecting a road scene of the class described and for imparting lateral shifting movements to said projected scene. By means of the present invention I make it unnecessary to swing or pivot or impart lateral movement to the projector itself, said deviating movements being imparted to a small, light and easily moved mirror mounted in the projection beam. By so utilizing a mirror it is possible to shift the projected picture laterally without employing any heavy mechanical parts or substantial power and, within the range of projection required for testing mechanism of the class described, there is little or no distortion of the projected image. The convenience of moving the image and the accuracy of recording its lateral movements are greatly increased.

It will be understood that the foregoing general description and the following detailed description as well are exemplary and explanatory but are not restrictive of the invention.

Referring now in detail to the present preferred embodiment of the invention, illustrated by way of example in the accompanying drawings, Fig. 1 shows diagrammatically those parts of an automobile driver testing or educating mechanism which are pertinent to the present invention. As embodied, a driver's seat 1 is positioned with respect to a steering wheel 2 in the conventional manner. A hood 3 corresponding to that of an automobile is positioned in fixed relation with respect to the driving seat in front of the steering wheel. Said hood is preferably formed and shaped so as to give from the driver's seat substantially the same appearance as the hood of a car on the road. Just beyond the front end or nose 4 of the hood is mounted a projection screen 5 upon which is projected the motion picture road to be used in creating the illusion of driving. The length and shape of the hood 3 and the distance from the driver's seat to the screen are all suitably calculated to provide the proper perspective so that when a moving road scene of the proper size is projected on said screen the illusion of actually driving the car along the road is created and maintained. Said road scene is preferably one photographed cinematically from a vehicle moving along the road, the field of view of the camera being substantially that of the driver of the vehicle.

Means for projecting the motion picture scene upon the screen 5 comprises the motion picture projector conventionally shown at 10. Said projector is mounted to cast its beam upon a mirror 11 normally positioned with its plane at an angle of 45° to the axis of the beam thereby to reflect the beam directly upon the screen 5 as shown. The mirror 11 is mounted for pivotal movement about a vertical axis 12. As shown the mirror is fixed to rearwardly extending bracket members 13 which are fixed to the vertical axle member 12, the latter being journaled in a lower supporting bracket arm 14 and at its upper end passes through a journal bracket 15. Said brackets 14 and 15 project from the plane of the supporting plate 16, which in turn is supported parallel to the main plate 17, on which the projector 10 and the other main parts of the projecting mechanism are mounted.

In accordance with the invention means are provided for imparting pivotal movements to the mirror about the vertical axis 12 so as to shift the projected picture laterally across the screen 5. Said pivotal movements are imparted to the mirror in one sense by movements of the steering wheel 2 and in the other sense in response to a predetermined pattern, preferably the steering course pattern of the route to be followed; said pattern being derived from a control track on the film itself as hereinafter described. For imparting these pivotal movements to the mirror, the invention provides two mirror-actuating coils 20 and 21 mounted at either side of the mirror axis and extending from the mirror bracket supporting plate 16. A bar yoke 22 is connected to the upper end of the axle 12 by a bracket member 23. Said yoke has at one end a solenoid core or armature 24 which extends into the coil 20 and at the other end a similar armature 25 extending into the coil 21. Said bar 22 in its normal position lies parallel to the axis of the projected beam from the lens of the projector 10 and thereby holds the mirror at the normal 45° angle as shown in Fig. 1. The field of coil 20 is subject to variations through actuations of the steering wheel 2 while the field of coil 21 is similarly influenced from the steering pattern on the projected film.

Referring first to the control of the field of coil 20 from the steering wheel 2, the coil is energized by means of a line circuit comprising the wires 30 and 31. Wire 31 is connected across a variable resistance 32, the resistance thereof being varied by turning movements of the steering wheel, thereby to vary the field of coil 20 in accordance with amounts corresponding to the turning of the steering wheel. As embodied, the steering wheel 2 is fixed to shaft 35 which has a pinion 36 engaging the teeth of the geared segment 37 on parallel shaft 38. The resistor 32 comprises a conventional rheostat coil mounted at the ends of bracket arms 39 and having its upper surface in contact with a variably positionable contact member 40. Contact member 40 is adapted to sweep across the surface of resistor 32, the arcuate or sweeping movement being imparted thereto by movement of the steering wheel through the segment 37, member 40 being fixed to turn with shaft 38 by means of a supporting arm 41 projecting from said shaft and carrying a U-shaped bracket 42. The ends of contact member 40 are journaled for rotary movement in bracket 42 as it slides across the face of resistor 32. It will therefore be clear that any movement of the steering wheel will impart a corresponding movement of the contact 40 across resistor 32 and thereby vary the field of mirror coil 20.

In many forms of the invention it is desirable to vary the speed of projection of the motion picture of the road to simulate varying speeds of travel therealong. In the present invention variations are imparted to the projector speed in response to movements of an accelerator pedal 45 which is positioned adjacent the steering wheel 2 in the conventional arrangement. Through appropriate linkage comprising the bell crank 46, pivoted link 47, the accelerator pedal is adapted to control a variable resistance 48 and the projector motor. The contact member 49 is attached to the free end of the bell crank and moves across the contacts of the variable resistance as will be clear from Fig. 2. As shown, the circuit for the motor 50 of projector 10 is in series with said variable resistance 48 and thereby the speed of the projector is controlled.

In accordance with the invention means are provided for coordinating the steering wheel control of mirror coil 20 with the varying speed of projection effected by the accelerator control 45, and for increasing the transverse movement of the projected picture with increases in projector speed at any given turning of the steering wheel. As embodied, the bell crank 46 of the accelerator control is fixed to a transverse shaft 55 and said shaft also is fixed to and supports the bracket arms 39 of the steering resistance 32. As will be clear from Fig. 2, rotary movement of shaft 55 imparts a corresponding rocking movement to resistor 32. For insuring continued contact between the resistor 32 and the contact roller member 40, said member 40 is provided with an arcuate surface corresponding to peripheral arc of member 32 so that contact between member 40 and member 32 is maintained at any position within the limits of movement of the latter.

It will be understood that when the resistor is positioned relatively near the axis of the steering segment 37, any turning of the steering wheel will cause the contact member 40 to move over a relatively limited portion of the resistor. However, when the accelerator is depressed the outer part of contact roller 40, moving over a greater arc for any turning of the steering wheel, will consequently effect a greater change in the condition of the mirror coil 20.

Referring now to the controls for the mirror coil 21, it will be understood that same is designed to impart arbitrary deviating movements to the mirror (and thereby to the road scene) in accordance with a pattern carried on the projected film itself. Referring to Fig. 4 it will be seen that the motion picture film F is perforated at 60 on one side only, the opposite side or track 61 being unperforated and having imprinted photographically thereon a track or pattern 62 of varying width. Said pattern 62 may be opaque while the remaining portion of the track 61 is transparent or, preferably, the pattern 62 is transparent while the remainder of the track 61 is opaque. In either case the width of the pattern track 62 varies in accordance with the position desired to be imparted to the mirror 11 through the coil 21. Said pattern corresponds to the curvilinear track or course of the roadway projected from the motion picture film. For example as diagrammatically shown in Fig. 4, when the portion of the steering pattern is of median width (in practice $\frac{3}{32}''$) as between lines A and B, the current in coil 21, through the photo-electric controls hereinafter described, is such that no deviating movement is imparted thereby to the mirror 11. The portion of the steering pattern or track B—C is shown of maximum width (in practice $\frac{7}{16}''$), capable of imparting a maximum deviation in one direction to the mirror 11 through the controlling coil 21. In the section C—D of the steering track or pattern, said track diminishes to a minimum or zero width, thereby imparting a maximum deviation of the mirror in the opposite direction.

The deviations of the mirror 11 corresponding to the pattern 62 on the film are effected by photo-electric controls so as to link the position of the mirror with that called for by the pattern on the film at any given moment. As embodied, the circuit 65 controlling the field of coil 21 is connected through a conventional amplifier 66 having tube 67 and condenser 69 to the output of a photo-electric cell 70. Said cell is positioned to receive the rays of an exciter lamp 71 which pass through a suitable gate 72 lying across the steering track or pattern 62 of the film F as it is fed from the projector 10.

As will be clear from the drawings, the amount of energy transmitted to the photo-cell 70 will depend upon the width of the track 62 and consequently said track width will determine the position of the mirror 11 in so far as the coil 21 is concerned. Thus when the track is of intermediate width, as in the section A—B, the output of the photo-electric cell will be of intermediate extent and thereby the coil 21 will tend to hold the mirror in the neutral of 45° position. Consequently a track of said intermediate width will be utilized when it is not desired to move the projected picture off its normal axis with respect to the hood of the car 4 and consequently said intermediate width track A—B will correspond to a length of straight road, on which proper steering would require no movement of the steering wheel from the normal or straight-ahead position. For indicating a right-hand turn the full width track B—C energizes the cell 70 and causes the mirror to swing the maximum extent so as to throw the picture on the screen the maximum distance to the left as viewed by the driver. That deviation of the picture will require the subject to turn the steering wheel to the right in order to hold the nose 4 of the hood of the car at the center line or appropriate point in the picture road for proper steering. Similarly when the track 62 diminishes to less than the intermediate width, as in section C—D, the mirror is swung in the opposite direction, moving the picture road to the right. This requires the subject to turn the steering wheel 2 toward the left in order to compensate for the deviation imparted by coil 21 and thereby, through the controls of coil 20, to bring the mirror to or hold it in the neutral or balanced position. Thus the mirror 11 and its projected picture are being continually influenced by the width of the pattern 62 on the film and the subject must continually steer with wheel 2 in order to prevent the picture road from moving out from under the steering point 4 of the car hood. In this way the illusion of actual driving and steering over a curving road or course is accurately simulated. By watching the character of the road unfolding in front of him and judging how it should be steered, a skillful driver will be able to hold the mirror 11 practically motionless, thereby experiencing the illusion of travelling around curves while steering the car properly. However, if the driver neglects to turn the steering wheel sufficiently or over-steers, he will experience the illusion of driving toward or off the side of the road. As the projector is driven at greater speed through the accelerator control 45, smaller deviations in steering produce relatively great errors because of the time relationship between the travel on the road and the angle of steering.

While a photo-electrical steering control track is preferably printed on the film F as shown, certain features of the invention may also be achieved by using a control pattern separate from the film, such as a separate tape or cam for imparting movements to the mirror, either photo-electrically or by direct mechanical linkage. Such separate devices, however, have the disadvantage of requiring special synchronization and coordination with the film F.

The invention also provides means for recording deviations of the mirror 11 (corresponding to errors in steering or uncorrected deviations imparted by the pattern course 62). As embodied, a record sheet 80 is diagrammatically shown in printing position between a printing segment 81 and a solenoid-actuated printing plunger or key 82. The printing segment 81 is provided with printing characters 82' on its periphery, said characters corresponding to any suitable or arbitrary scale for indicating errors in steering. For example, as shown the segment 81 is graduated from 0 to 9, the center or neutral position being at 4½, i. e., between the characters 4 and 5. Steering deviations to the left, for example, will be indicated by the characters 0 to 4 and those to the right by 5 to 9.

Means are provided for positioning the printing segment 81 correspondingly to the position of the mirror 11, the two being in complete correspondence at all times. As embodied, an actuating geared segment 85 is in driving engagement with a pinion 86 at the axis of the segment 81. Segment 85 is pivoted at 87 and is provided with a yoke armature 88, the ends of which project into and form the cores of coils 89 and 90, respectively. Coil 89 is electrically linked in parallel with coil 20 of the mirror controls and thus is energized and actuated in exact correspondence therewith while similar coil 90 is connected in parallel with circuit 65 of the mirror coil 21. Thus the armature 88 is caused to pivot in direct correspondence with the mirror armature 22 and thereby the position of the printing segment 81 is always the equivalent of that of the mirror 11.

The invention provides means for actuating the printing plunger or key 82 at any desired time so as to record the steering deviation indicated by the segment 81 at the moment of printing. Preferably the actuations of the plunger are timed to occur at predetermined points with respect to the picture being projected from the film F. For this purpose the film is provided with switch-actuating notches 95 along one edge, said notches being adapted to cooperate with the switch roller 96 which is positioned to bear against the moving edge of the film. Said roller 96 is connected to the actuating arm of a micro-switch 97 which is positioned to open and close a line circuit 98. A rectifier tube 68 is connected across the circuit. The circuit connects to the terminals of a solenoid 99 which actuates the printing plunger 82. Thus when the circuit 98 is closed by the micro-switch 97 through contact of the roller 96 with a notch 95 on the film, the printing plunger 82 is actuated to impress the paper against the opposite character of the printing segment 81. For this printing operation, the paper may be provided with suitable impression carbon or the segment characters 82 may be inked by any suitable means not shown. If a plurality of impressions are desired upon the paper 80, suitable means (not shown) for feeding same between printings may be provided and if desired said means may be actuated from the switch 96 or a similar switch controlled from movement of the film. If periodic printings showing the position of the printing segment are desired, a suitable timing device, driven from a clock or from the projector motor, may be provided to actuate the switch 97.

A modified form of control for the mirror control 20 is shown in Fig. 5. This mechanism provides a more accurate and positive means for controlling the position of the mirror through the combined functions of the angle and extent of turning of the steering wheel and the speed of the projected picture, i. e., the apparent speed of the vehicle along the road. As shown, the field of coil 20 is regulated from a variable resistance 100 in the coil circuit. The amount of resistance is varied by the position of an angularly-movable contact arm 101 which is actuated from a series motor 102 through reduction gearing 103 and shaft 104. The position of the contact arm 101 with respect to the resistance coil 100 and thereby the amount of resistance introduced into the coil 20 is regulated both by the speed and direction of rotation of the motor 102. In accordance with the invention the speed of the motor 102 is made to correspond to the speed of the projected picture as determined by the position of the accelerator pedal 45. The motor speed is also regulated by the amount of turning imparted to the steering wheel 2 (i. e., the steering angle), while the direction of rotation of the motor is determined by the direction of turning of the steering wheel.

Referring first to the controls as influenced by the direction of turning of the steering wheel, the steering wheel shaft is connected to drive a horizontally-disposed shaft 110 as by friction disc 111 spring pressed against roller 112 and splined to shaft 110, or alternatively by suitable gearing. The friction drive is preferred because it obviates breakage or strain on the mechanism when a subject tends to over-steer or turn the steering wheel an excessive amount or beyond the limits of the machine. Means for imparting driving current to the armature 105 of the motor whenever the steering wheel is turned from a central or neutral position comprises a double-pole, double-throw switch, the central member 115 of which is pivoted at an intermediate point 116 while the outer end is provided with a roller 117 riding on a cam 118 on the shaft 110. Turning the steering wheel in one direction (say to the right) from the position shown will maintain the switch closed in the position shown and thereby determine the direction of flow of the current through the armature and over the circuit wires 119. Turning in the other direction from the neutral point will cause the roller to drop onto the narrower part of the cam 118, closing the switch through the lower pair of contacts and thereby reverse the direction of current through the circuit 119 and the armature of the motor.

Means for preventing any current flow through the motor except when the steering wheel has been turned from the central or neutral position comprises a switch arm 120 mounted on the shaft 110 and positioned to sweep across the variable resistance coils 121 and 122. Said coils are separated and at the central or neutral position the contact arm 20 lies between them and out of contact with either of them. Movement of the contact arm toward the right or clockwise causes it to engage contacts on the coil 121 and thereby energizes the motor field circuit wires 123 in that direction. The extent of energization depends upon the distance which the arm 120 is moved from the center toward the end of the resistance coil 121 and thereby the amount of turning of the motor 102 will be subject to the angle of turning of the steering wheel. Similarly when the steering wheel is turned in the opposite direction, the contact 120 encounters and moves across the resistance 122 thereby varying the amount of energy supplied to the motor in accordance with the amount the steering wheel is turned from the neutral or straight-ahead direction. Direction of rotation of motor 102 is determined by position of switch 115, when actuated by cam 118, to its raised or lowered positions. The directions of current from the line through one leg of circuit 119 to the right hand bush returning to switch 115 in its raised position, thence to field of motor 102, rotates the motor in one direction. Switch arm 115 in its lower position reverses the direction of current feed through bushs 105, thereby reversing direction of motor 102.

Means are also provided for varying the speed of the motor 102 in accordance with the position of the accelerator pedal 45. As shown a variable resistance 125 is provided to be controlled by the position of the accelerator pedal through the movable contact arm 126 which is linked to the accelerator pedal. The circuit wire 127 connects from the line through the variable resistance 125 to the contact arm 120 thereby varying the supply of current through the field coils of the motor in accordance with the position of the accelerator pedal.

It will be seen therefore that the field of mirror control coil 20 and therefore the position of the projection mirror 11 will depend upon the operation of the steering wheel 2 in conjunction with the accelerator control of the vehicle. When the steering wheel is turned in a given direction, say to the right, that determines the direction of turning of the motor 102 and thereby through resistance 100 determines whether the field of coil 20 will be increased or decreased to move the mirror 11 from its neutral position. The speed of movement of the contact arm 101 along the resistance 100 will vary the intensity of the increase or diminution of the strength of coil 20. The speed of movement of that arm will depend on the speed of the motor and that in turn upon the combined effects of the variable resistance 125 (subject to the position of the accelerator pedal) and the resistance 121 or 122, subject to the amount of turning of the steering wheel. Thus an extensive turning of the wheel over a large angle will of itself cause the vehicle to appear to move sharply toward the edge of the road at a given speed, while an increase of the apparent speed caused by depressing the accelerator pedal will intensify the apparent movement across the road at that or any given steering angle, just as occurs in actually driving a car.

The invention in its broader aspects is not limited to the specific mechanisms shown and described but departures may be made therefrom within the scope of the accompanying claims without departing from the principles of the invention and without sacrificing its chief advantages.

What I claim is:

1. In a driver testing machine in combination means for presenting a scene to the subject being tested, a subject-operated control, means responsive to actuations of said control by the subject for moving the scene and other means for imparting movements to said scene independent of those imparted thereto by the subject through actuation of said control.

2. In a driver testing machine in combination means for presenting a scene to the subject being tested, a vehicle steering control, means responsive to actuations of said control by the subject for moving the scene laterally and other means for imparting lateral movements to said scene independent of those imparted thereto by the subject through actuation of said control.

3. In a driver testing machine in combination means for presenting a road scene to the subject being tested, means for imparting movement to said scene to create the illusion of forward travel over the road, a vehicle steering control, means responsive to actuations of said control by the subject for moving the scene laterally and other means operated independently of the subject for imparting lateral movements to said scene.

4. In a driver testing mechanism in combination means for projecting a scene before the subject being tested, a mirror in the path of projection for changing the direction of said path, a control member operated by the subject and means actuated by operation of said control for moving the mirror to vary the position of the projected scene.

5. In a driver testing mechanism in combination means for projecting a scene before the subject being tested, a mirror in the path of projection for changing the direction of said path, said mirror being angularly movable to vary the position of the projected scene and means operated by the subject for moving the mirror.

6. In a driver testing mechanism in combination means for projecting a scene before the subject being tested, a mirror in the path of projection for changing the direction of said path, said mirror being angularly movable to vary the position of the projected scene and control means for imparting movements to the mirror to vary the position of the scene according to a predetermined pattern.

7. In a driver testing mechanism in combination means for projecting a scene before the subject being tested, a mirror in the path of projection for changing the direction of said path, said mirror being angularly movable to vary the position of the projected scene, control means for imparting movements to the mirror to vary the position of the scene according to a predetermined pattern and means controlled by the subject for varying the position of the mirror to correct for the deviating movements imparted to the scene by said control means.

8. In a driving testing mechanism in combination means for projecting a motion picture of a changing road scene before the subject being tested, an angularly movable mirror in the path of projection, and control means for imparting angular movements to said mirror to shift the road scene laterally with respect to the subject according to a pattern corresponding to the curves in the road portrayed in the picture.

9. In a driving testing mechanism in combination means for projecting a motion picture of a changing road scene before the subject being tested, and angularly movable mirror in the path of projection, control means for imparting angular movements to said mirror to shift the road scene laterally with respect to the subject according to a pattern corresponding to the curves in the road portrayed in the picture and steering means operated by the subject for also varying the angular position of said mirror to give the illusion of steering around the curves in said road scene.

10. In a testing machine in combination a motion picture projector, means for feeding a film therethrough, a screen for the projected picture positioned in view of a subject, means for varying the position of the projected picture on the screen and control means carried by the film for governing said varying means.

11. In a testing machine in combination a motion picture projector, means for feeding a film therethrough, a screen for the projected picture positioned in view of a subject, photoelectric means for varying the position of the projected picture on the screen, and a control track on the film for cooperating with said photoelectric means.

12. In a testing machine in combination a motion picture projector, means for feeding a film therethrough, a screen for the projected picture positioned in view of a subject, an angularly movable mirror in the path of projection, and means synchronized with the projection of the film for imparting movements to said mirror to vary the position of the projected picture.

13. In a testing machine in combination a motion picture projector, means for feeding a film therethrough, a screen for the projected picture positioned in view of a subject, an angularly movable mirror in the path of projection, control means carried by the film for imparting deviating angular movements to the mirror and means actuated by the subject for imparting other movements to the mirror.

14. A motion picture film for projection in a testing machine comprising pictures of a road scene and a track of varying light characteristics carried by the film and corresponding to changes in direction of the road portrayed on the film.

15. In a driver testing machine in combination means for presenting a scene to the subject being tested, a vehicle steering control, means responsive to actuations of said control for moving the scene independent of those effected by actuation of said steering control and other means for imparting movements to said scene, and recording means operable during the presentation of said scene for recording the steering operations of the subject viewing said scene.

16. In a testing machine in combination a motion picture projector and film for projecting a motion picture of a scene to be observed by the subject being tested and printing means for registering actions of the subject while viewing said scene, said means including a photoelectric device for controlling the operation of said printing means and a track of varying light characteristics movable with the film for governing the operation of said photoelectric device.

17. In a testing machine in combination a motion picture projector, means for feeding a film therethrough, a control operable by a subject viewing the scene projected by said projector and means for registering operations of said control by the subject including a member for actuating said registering means, said member having contact with the film and means carried by the film for moving said contact member.

18. In a testing machine in combination a motion picture projector, means for feeding a film therethrough, a control operable by a subject viewing the scene projected by said projector and means for registering operations of said control by the subject including a printing device, a switch for controlling actuation of said printer, said switch being in movable contact with the film and a notch on the film for moving the switch.

19. In a testing machine in combination a motion picture projector and film for projecting a scene to be observed by the subject being tested, a member operable by the subject, electrical control means responsive to movement of said member, other electrical control means responsive to a light-varying track carried by the film, and a member movable responsively to the combined electrical influences of said subject-operated control and said film-operated control.

CONKLING CHEDISTER.